(12) United States Patent
Nomura

(10) Patent No.: US 10,012,878 B2
(45) Date of Patent: Jul. 3, 2018

(54) DISPLAY APPARATUS

(71) Applicant: Japan Display Inc., Tokyo (JP)

(72) Inventor: Morikazu Nomura, Tokyo (JP)

(73) Assignee: Japan Display Inc., Tokyo (JP)

( * ) Notice: Subject to any disclaimer, the term of this patent is extended or adjusted under 35 U.S.C. 154(b) by 42 days.

(21) Appl. No.: 15/376,750

(22) Filed: Dec. 13, 2016

(65) Prior Publication Data
US 2017/0176820 A1 Jun. 22, 2017

(30) Foreign Application Priority Data
Dec. 18, 2015 (JP) ................................. 2015-247701

(51) Int. Cl.
| | | |
|---|---|---|
| G02F 1/1345 | (2006.01) | |
| G02F 1/1333 | (2006.01) | |
| G02F 1/1335 | (2006.01) | |
| G02F 1/1343 | (2006.01) | |
| G02F 1/1362 | (2006.01) | |
| G02F 1/1337 | (2006.01) | |
| G02F 1/1339 | (2006.01) | |

(52) U.S. Cl.
CPC ........ *G02F 1/13452* (2013.01); *G02F 1/1345* (2013.01); *G02F 1/133345* (2013.01); *G02F 1/133512* (2013.01); *G02F 1/134309* (2013.01); *G02F 1/136286* (2013.01); *G02F 1/1337* (2013.01); *G02F 1/1339* (2013.01); *G02F 2201/123* (2013.01)

(58) Field of Classification Search
CPC ............... G02F 1/1345; G02F 1/13452; G02F 1/134309; G02F 1/133512; G02F 1/136286; G02F 1/1339; G02F 1/133345; G02F 1/1337
See application file for complete search history.

(56) References Cited

U.S. PATENT DOCUMENTS

| | | | |
|---|---|---|---|
| 7,034,810 B2 * | 4/2006 | Goto | ................. G02F 1/133617 349/140 |
| 7,671,957 B2 | 3/2010 | Aoki et al. | |
| 8,248,568 B2 | 8/2012 | Anjo et al. | |
| 2007/0296674 A1 | 12/2007 | Aoki et al. | |
| 2009/0268145 A1 | 10/2009 | Anjo et al. | |

FOREIGN PATENT DOCUMENTS

| | | |
|---|---|---|
| JP | 2008-026869 A | 2/2008 |
| JP | 2009-265484 A | 11/2009 |

* cited by examiner

*Primary Examiner* — Dung Nguyen
(74) *Attorney, Agent, or Firm* — Typha IP LLC

(57) ABSTRACT

Even when a width of a frame region is narrowed, expansion and movement of impurity ions into a display region and peeling off of a seal material are prevented or suppressed. A substrate includes a first frame region positioned outside a display region, a second frame region positioned outside the first frame region, and a third frame region positioned outside the second frame region. The substrate includes a first electrode in the first frame region, a second electrode in the second frame region, and a third electrode in the third frame region. A first potential is applied to the first electrode, a second potential larger in an absolute value than the first potential is applied to the second electrode, and a third potential different from the second potential is applied to the third electrode.

20 Claims, 10 Drawing Sheets

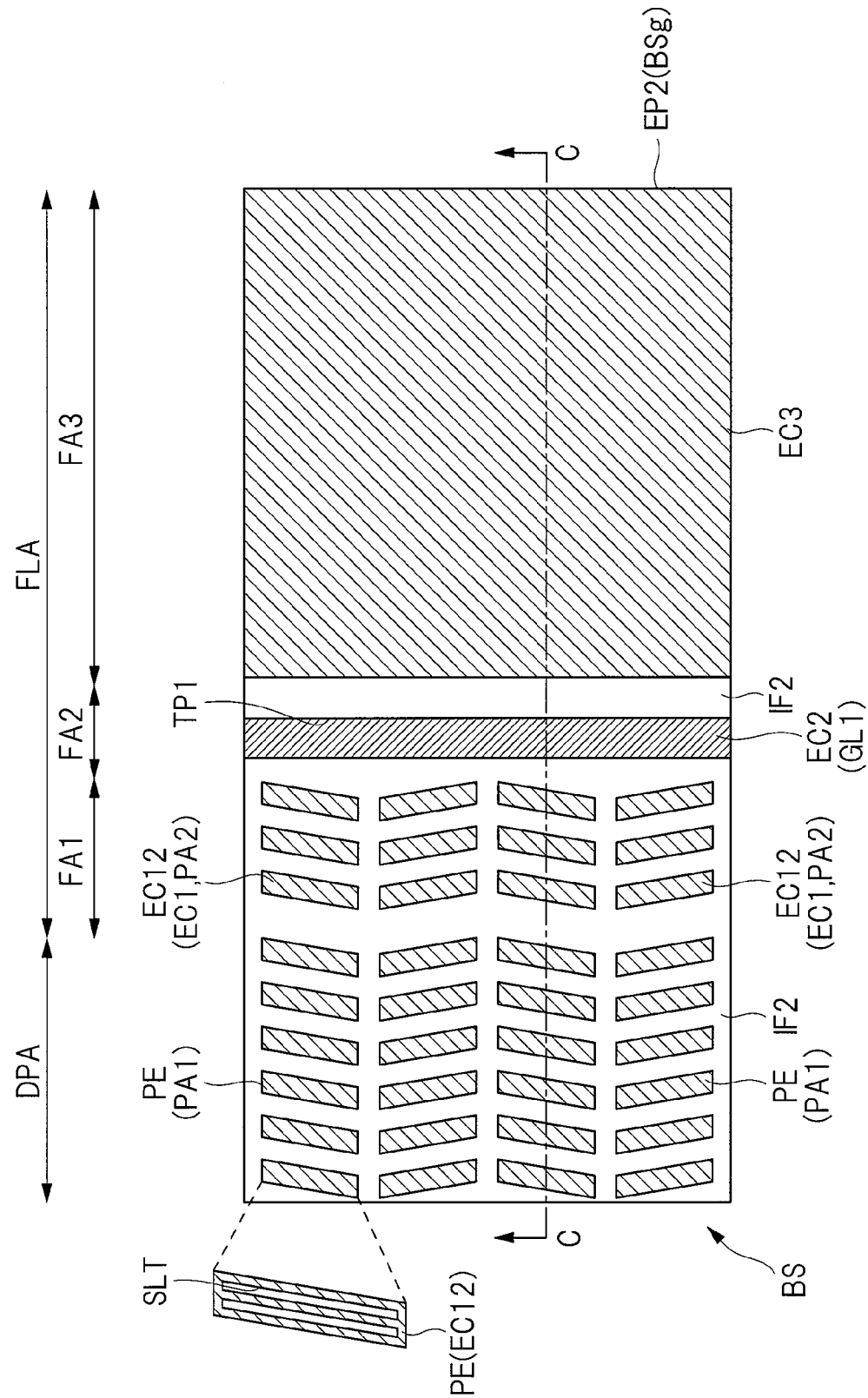

DISPLAY APPARATUS

CROSS-REFERENCE TO RELATED APPLICATION

The present application claims priority from Japanese Patent Application No. 2015-247701 filed on Dec. 18, 2015, the content of which is hereby incorporated by reference into this application.

TECHNICAL FIELD OF THE INVENTION

The present invention relates to a display apparatus, and a technique effectively applied to, for example, a display apparatus including a display region in which a plurality of pixels are provided.

BACKGROUND OF THE INVENTION

A display apparatus, which feeds a signal to a plurality of pixels provided in a display region via a plurality of signal lines and displays an image, has been known. In such a display apparatus, a width of a frame region on an outside of the display region is required to be reduced in order to downsize the display apparatus and enlarge the display region.

The display apparatus includes a substrate on a display surface side, a substrate on the opposite side to the display surface side, and a liquid crystal layer arranged between the substrate on the display surface side and the substrate on the opposite side to the display surface side. Such a display apparatus includes a seal material formed in the frame region for sealing the liquid crystal layer in a plan view.

Japanese Patent Application Laid-Open Publication No. 2008-26869 (Patent Document 1) describes a technique in a display apparatus including an array substrate including a pixel electrode, an opposite substrate oppositely arranged in the array substrate and including an opposite electrode, and a seal material formed to surround the display region for bonding the array substrate and the opposite substrate.

Japanese Patent Application Laid-Open Publication No. 2009-265484 (Patent Document 2) describes a technique in a liquid crystal display apparatus in which a liquid crystal layer is sandwiched between a TFT substrate having a Thin-Film Transistor (TFT) formed therein and an opposite substrate opposing the TFT substrate and having a color filter formed therein, and in which the liquid crystal layer is sealed with a seal material formed in periphery of the TFT substrate and the opposite substrate.

SUMMARY OF THE INVENTION

In such a display apparatus, impurity ions are generated from moisture which has entered the display apparatus from outside or from impurities contained in each of sections in the display apparatus. The generated impurity ions are moved and gradually gathered by an electric field formed by each of wirings. Therefore, if an amount of the generated impurity ions is large or if the width of the frame region is narrow, the generated impurity ions also move while expanding into the display region, and therefore, there is a risk of occurrence of a failure in an image displayed in the display region.

In order to prevent the entering of the moisture from outside into the display apparatus, it is important to prevent peeling off of the seal material from the substrate on the opposite side to the display surface. However, in order to prevent the peeling off of the seal material, it is required to increase the width of the seal material. Therefore, the width of the frame region cannot be easily increased.

The present invention has been made to solve the problems in a conventional technique as described above, and has an object which provides the display apparatus capable of preventing or suppressing the movement and expansion of the impurity ions into the display region and the peeling off of the seal material even when the width of the frame region is narrow.

The typical ones of the inventions disclosed in the present application will be briefly described as follows.

A display apparatus according to an aspect of the present invention includes: a substrate including a display region including a plurality of first pixel regions; a light shielding film formed outside the display region in a plan view; and a liquid crystal layer opposing the display region. The substrate includes: a first peripheral region which is superimposed on the light shielding film in a plan view and is positioned outside the display region in a plan view; a second peripheral region which is positioned outside the first peripheral region in a plan view; and a third peripheral region which is positioned outside the second peripheral region in a plan view. The substrate includes: a first electrode formed in the first peripheral region; a second electrode formed in the second peripheral region; and a third electrode formed in the third peripheral region. A first potential is applied to the first electrode, a second potential, which is larger in absolute value than the first potential, is applied to the second electrode, and a third potential different from the second potential is applied to the third electrode.

In another aspect, the first peripheral region may include a plurality of second pixel regions, and the first electrode may be formed in the second pixel region.

In another aspect, the substrate may include an insulating base material, an insulating film formed on the insulating base material, and a pixel electrode formed in the first pixel region, and the third electrode and the pixel electrode may be formed in the same layer as each other.

In another aspect, the substrate may include an insulating base material and an insulating film formed on the insulating base material, the third electrode may be formed on the insulating film, the insulating film may have a trench section in the second peripheral region, and the second electrode may be formed at the bottom of the trench section.

In another aspect, the substrate may include a plurality of scanning lines and a plurality of video lines respectively intersecting the plurality of scanning lines, the plurality of first pixel regions may be formed by intersection between the plurality of scanning lines and the plurality of video lines, and the second electrode may be a scanning lead line connected to the scanning line or a video lead line connected to the video line.

In another aspect, a third potential with a reverse polarity to that of the second potential may be applied to the third electrode.

In another aspect, the display apparatus may include a seal material which seals the liquid crystal layer, the second electrode may not be superimposed on the seal material in a plan view, and the third electrode may be superimposed on the seal material in a plan view.

In another aspect, the third potential, which is larger in absolute value than the second potential, may be applied to the third electrode.

In another aspect, the substrate may include an insulating base material, an insulating film formed on the insulating base material, an orientation film which orients the liquid crystal layer, and a seal material which is formed in the third peripheral region and seals the liquid crystal layer, the seal material and the orientation film may contact each other in the third peripheral region, and the third electrode may be formed between the insulating film and the orientation film in the third peripheral region.

In another aspect, the trench section may extend in a direction intersecting an arrangement direction of the first electrode, the second electrode, and the third electrode.

In another aspect, the substrate may include a plurality of scanning lines and a plurality of video lines respectively intersecting the plurality of scanning lines, the plurality of first pixel regions may be formed by intersection between the plurality of scanning lines and the plurality of video lines, and the second electrode may be formed of the same material as that for the video lines.

BRIEF DESCRIPTIONS OF THE DRAWINGS

FIG. 10 is a plan view of a frame region and the vicinity of the frame region in another example of the modification example of the display apparatus according to the embodiment.

DESCRIPTIONS OF THE PREFERRED EMBODIMENTS

Figure 1:
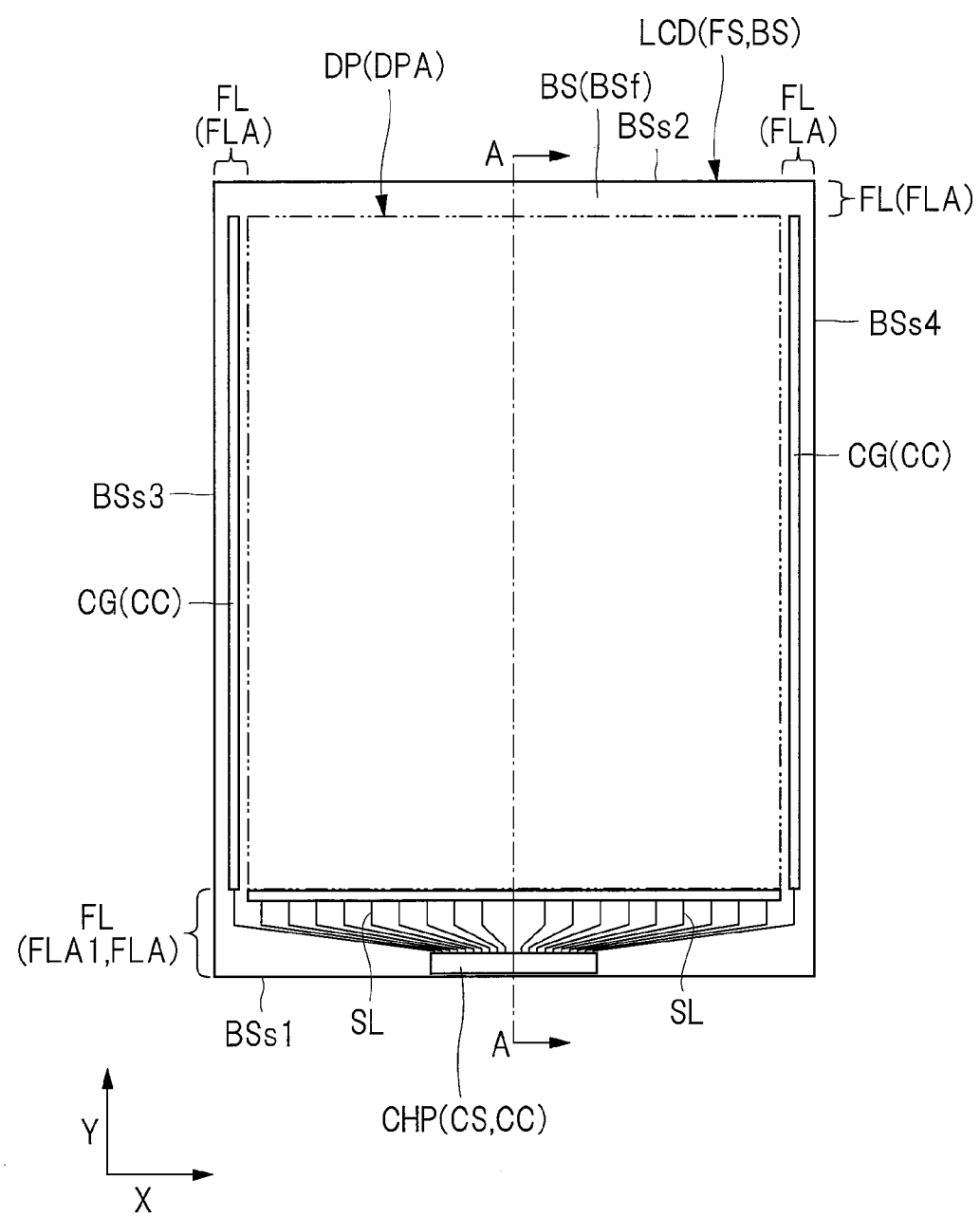
FIG. 1 is a plan view illustrating an example of a display apparatus according to an embodiment.

The following is explanation for the embodiment of the present invention with reference to drawings.

Note that disclosure is merely one example, and appropriate modification with keeping the concept of the present invention which can be easily thought up by those who skilled in the art is obviously contained in the scope of the present invention. Also, in order to make the clear description, the drawings are illustrated more schematically for a width, a thickness, a shape, and others of each portion than those in an actual aspect in some cases. However, they are merely examples, and do not limit the interpretation of the present invention.

In the present specification and each drawing, similar elements to those described earlier for the already-described drawings are denoted by the same or similar reference characters, and detailed description for them is appropriately omitted in some cases. In description of a structure of a display apparatus in the present specification, a term "upper" indicates a side on which a transistor Tr and a control circuit are formed with respect to a substrate BS. And, a term "lower" indicates the opposite side to "upper".

Also, in some drawings used in the embodiments, hatching is omitted even in a cross-sectional view so as to make the drawings easy to see. Also, hatching is used even in a plan view so as to make the drawings easy to see.

A technique described below in the embodiment is widely applicable to a display apparatus including a mechanism for feeding a signal to a plurality of elements provided in a display region provided with a display functional layer from a periphery of the display region. Examples of the above-described display apparatus can include various display apparatus such as a liquid crystal display apparatus and an organic electro-luminescence (EL) display apparatus. In the embodiment described below, the liquid crystal display apparatus will be described as a typical example of the display apparatus.

The liquid crystal display apparatus is roughly classified into two categories described below, depending on an application direction of an electric field for changing an orientation of liquid crystal molecules of a liquid crystal layer as a display functional layer. That is, the first category includes a so-called vertical electric field mode in which an electric field is applied in a thickness direction (or an out-of-plane direction) of the display apparatus. Examples of the vertical electric field mode include a Twisted Nematic (TN) mode and a Vertical Alignment (VA) mode. The second category includes a so-called horizontal electric field mode in which an electric field is applied to a plane direction (or an in-plane direction) of the display apparatus. Examples of the horizontal electric field mode include an In-Plane Switching (IPS) mode and a Fringe Field Switching (FFS) mode as one type of the IPS mode. Note that the above-described vertical electric field mode includes a case in which an electric field is generated in an oblique direction between the thickness direction of the display apparatus and the plane direction. While the technique described below is applicable to both of the vertical electric field mode and the horizontal electric field mode, the display apparatus of the horizontal electric field mode will be exemplified in the embodiment to be described below as an example.

EMBODIMENT

Configuration of Display Apparatus

Figure 2:
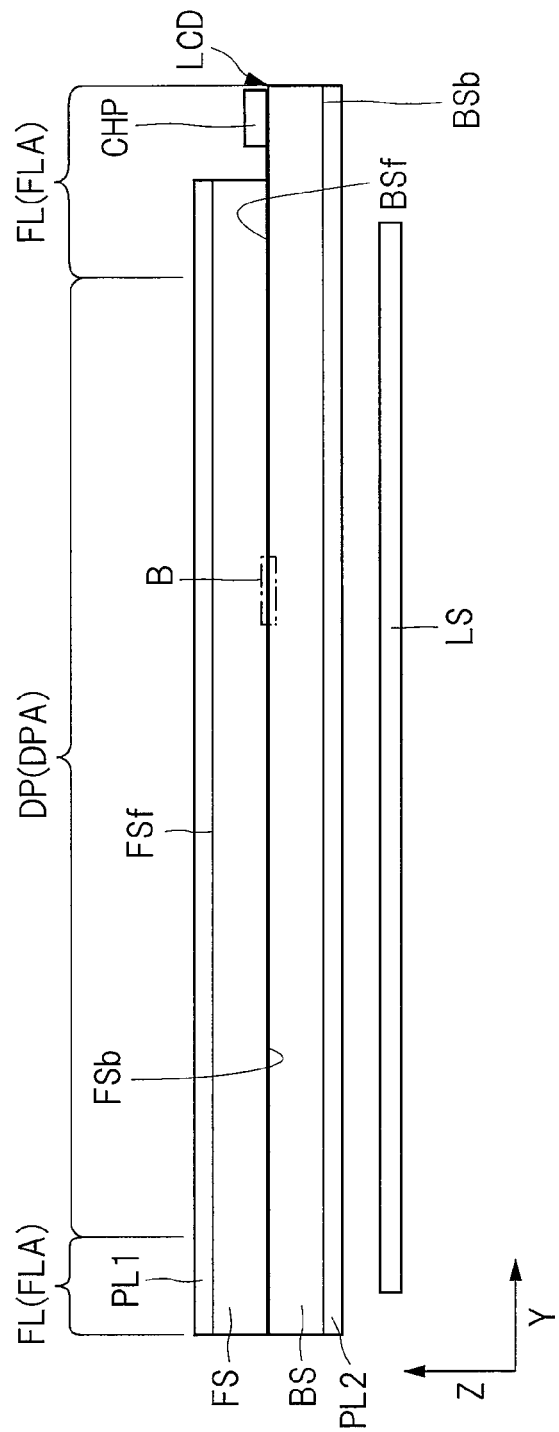
FIG. 2 is a cross-sectional view illustrating an example of the display apparatus according to the embodiment.
Figure 3:
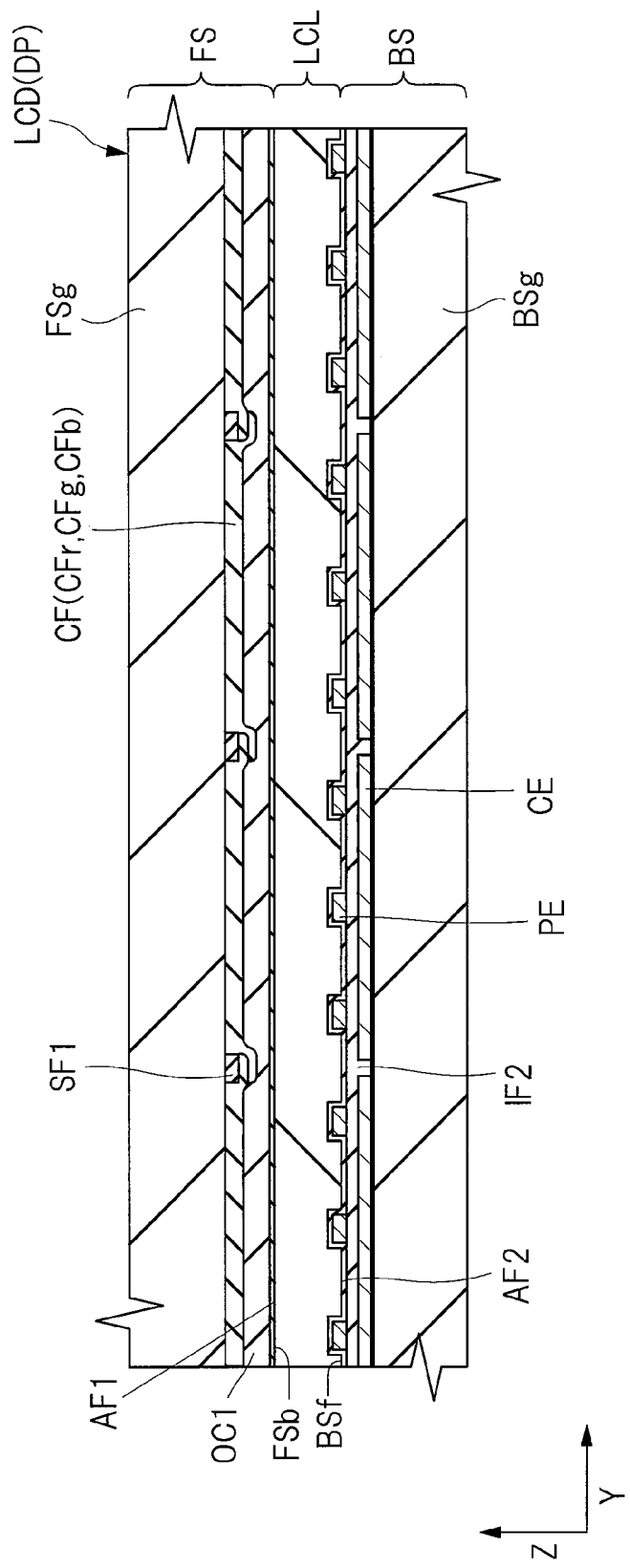
FIG. 3 is a cross-sectional view illustrating an example of the display apparatus according to the embodiment.

A configuration of a display apparatus will be described first. FIG. 1 is a plan view illustrating an example of a display apparatus according to an embodiment. FIGS. 2 and 3 are cross-sectional views illustrating the example of the display apparatus according to the embodiment. FIG. 2 is a cross-sectional view taken along a line A-A illustrated in FIG. 1. FIG. 3 is an enlarged cross-sectional view of a portion B illustrated in FIG. 2.

In FIG. 1, the contour of a display region DPA is indicated by a two-dot and dash line to make a boundary between a display region DPA and a frame region (peripheral area) FLA easy to see in a plan view. A plurality of signal lines SL illustrated in FIG. 1 extend from the frame region FLA to the display region DPA. However, illustration of the signal lines SL is omitted in the display region DPA for easily seeing FIG. 1. Although FIG. 2 illustrates a cross section, hatching is omitted for easily seeing.

As illustrated in FIG. 1, a display apparatus LCD according to the present embodiment includes a display section DP that displays an image. A region which is on a front surface BSf side (see FIG. 2) as a display surface side of the substrate BS and on which the display section DP is provided is a display region DPA. The display apparatus LCD includes a frame section (peripheral section) FL which is a frame-shaped portion around the display section DP and on which an image is not displayed. A region where the frame section FL is provided is a frame region FLA. That is, the frame region FLA is a frame region around the display region DPA. However, the shape of the frame region FLA is not limited to a frame shape.

In the present specification, note that a term "in a plan view" means "as viewed from a direction perpendicular to a front surface BSf of the substrate BS".

The display apparatus LCD has a structure in which a liquid crystal layer as a display functional layer is formed between a pair of substrates oppositely arranged. That is, the display apparatus LCD includes a substrate FS on the display surface side, a substrate BS positioned on the opposite side to the display surface side, and a liquid crystal layer LCL (see FIG. 3) arranged between the substrate FS and the substrate BS, as illustrated in FIG. 2. The liquid crystal layer LCL is opposite to the display region DPA.

Two directions intersecting each other, preferably perpendicular to each other, in the front surface BSf of the substrate BS (see FIG. 2) are set to a Y-axis direction and an X-axis direction. At this time, the substrate BS illustrated in FIG. 1 has a side BSs1 extending in the X-axis direction, a side BSs2 extending in the X-axis direction in parallel to the side BSs1, a side BSs3 extending in the Y-axis direction intersecting, preferably perpendicular to, the X-axis direction, and a side BSs4 extending in the Y-axis direction in parallel to the side BSs3. Respective distances from the sides BSs2, BSs3, and BSs4 of the substrate BS illustrated in FIG. 1 to the display section DP are substantially the same as each other, and are smaller than a distance from the side BSs1 to the display section DP.

In the present specification, description of "a peripheral edge of the substrate BS" means any one of the side BSs1, the side BSs2, the side BSs3. And, simple description of "a peripheral edge" means a peripheral edge of the substrate BS. Also, the peripheral edge of the substrate BS is also referred to as the end of the substrate BS in some cases.

The display section DP includes pixels Px (see FIG. 4, described below) as a plurality of display elements. That is, the plurality of pixels Px are provided in the display region DPA. The plurality of pixels Px are arranged in a matrix form in the X-axis direction and the Y-axis direction. In the present embodiment, each of the plurality of pixels Px includes a thin-film transistor (TFT) formed in the display region DPA on the front surface BSf side of the substrate BS.

The substrate BS of the display apparatus LCD includes a plurality of scanning lines GL and a plurality of signal lines (video lines) SL, as described below with reference to FIG. 4. The plurality of scanning lines GL is electrically connected to the plurality of pixels Px arranged in the X-axis direction, and the plurality of signal lines SL is electrically connected to the plurality of pixels Px arranged in the Y-axis direction, respectively, as described below with reference to FIG. 4.

The display apparatus LCD includes a circuit section CC. The circuit section CC includes a scanning line driving circuit CG and a signal line driving circuit CS. The scanning line driving circuit CG is electrically connected to the plurality of pixels Px via the plurality of scanning lines GL, and the signal line driving circuit CS is electrically connected to the plurality of pixels Px via the plurality of signal lines SL, respectively.

In an example illustrated in FIG. 1, a semiconductor chip CHP is provided in a frame region FLA1 as a portion between the side BSs1 of the substrate BS and the display section DP in the frame region FLA. The signal line driving circuit CS is provided in the semiconductor chip CHP. Therefore, the signal line driving circuit CS is provided in the frame region FLA1 as a region on the front surface BSf side of the substrate BS and arranged on the negative side in the Y-axis direction with respect to the display region DPA.

Note that "the negative side in the Y-axis direction" in the present specification means the opposite side to the side on which an arrow indicating the Y-axis direction in the drawing extends.

The semiconductor chip CHP may be provided in the frame region FLA1 using a so-called Chip On Glass (COG) technique. Alternatively, the semiconductor chip CHP may be provided outside the substrate BS, and may be connected to the display apparatus LCD via Flexible Printed Circuits (FPC). Details of an arrangement of the signal lines SL will be described below with reference to FIG. 4.

The display apparatus LCD includes a sealing section formed in the frame region FLA in a plan view. The sealing section is formed to continuously surround the display section DP. The substrate FS and the substrate BS illustrated in FIG. 2 are adhesively fixed to each other with a sealing material provided in the sealing section. When the sealing section is provided around the display section DP as described above, the liquid crystal layer LCL (see FIG. 3) as the display functional layer can be sealed.

As illustrated in FIG. 2, a polarizing plate PL2, which polarizes light emitted from a light source LS and directed toward a viewer VW (see FIG. 3), is provided on a back surface BSb side opposite to the display surface side of the substrate BS in the display apparatus LCD. The polarizing plate PL2 is fixed to the substrate BS. On the other hand, a polarizing plate PL1 is provided on the front surface FSf side as the display surface side of the substrate FS. The polarizing plate PL1 is fixed to the substrate FS.

As illustrated in FIG. 3, the display apparatus LCD includes a plurality of pixel electrodes PE arranged between the substrate FS and the substrate BS and a common electrode CE. The display apparatus LCD in the present embodiment is a display apparatus in a horizontal electric field mode, as described above. Therefore, each of the plurality of pixel electrodes PE and the common electrode CE is formed in the substrate BS.

The substrate BS illustrated in FIG. 3 includes a base material BSg composed of a glass substrate, and a circuit for image display is mainly formed on the base material BSg. The substrate BS has the front surface BSf positioned on the substrate FS side and the back surface BSb (see FIG. 2) positioned on the opposite side thereto. A display element such as a TFT and the plurality of pixel electrodes PE are formed in a matrix form on the front surface BSf side of the substrate BS.

In an example illustrated in FIG. 3, the display apparatus LCD in the horizontal electric field mode (specifically, a Fringe Field Switching (FFS) mode) is illustrated. Therefore, the common electrode CE is formed on the front surface side of the base material BSg included in the substrate BS, and is covered with an insulating layer IF2. The plurality of pixel electrodes PE are formed in a portion on the substrate FS side of the insulating layer IF2 to oppose the common electrode CE via the insulating layer IF2.

The substrate FS illustrated in FIG. 3 is a substrate in which a color filter CF forming an image for color display is formed in a base material FSg composed of a glass substrate, and has the front surface FSf (see FIG. 2) on the display surface side and the back surface FSb positioned on the opposite side to the front surface FSf. The substrate as the substrate FS having the color filter CF formed therein is referred to as an opposite substrate because it opposes a color filter substrate or a TFT substrate with a liquid crystal layer interposed therebetween when being distinguished from the substrate BS as a TFT substrate having the TFT formed therein. As a modification to FIG. 3, note that a configuration in which the color filter CF is provided in the substrate BS as a TFT substrate may be used.

In the substrate FS, the color filter CF configured by periodically arranging color filter pixels CFr, CFg, and CFb in three colors, i.e., R (red), G (green), and B (blue) is formed on one surface of the base material FSg such as the glass substrate. In a color display apparatus, sub-pixels in three colors, R (red), G (green), and B (blue) are taken as, for example, one set to constitute one pixel. The plurality of color filter pixels CFr, CFg, and CFb in the substrate FS are arranged at positions opposing respective sub-pixels having the pixel electrodes PE formed in the substrate BS.

A light shielding film SF1 is formed at respective boundaries among the color filter pixels CFr, CFg, and CFb in the respective colors. The light shielding film SF1 is composed of, for example, black resin or a metal having low reflectivity. The light shielding film SF1 is formed in a lattice form in a plan view. In other words, the substrate FS includes the color filter pixels CFr, CFg, and CFb in the respective colors formed in opening portions in the light shielding film SF1 formed in a lattice form. Note that the colors constituting one pixel are not limited to the three colors R (red), G (green), and B (blue), and may further include white (W) having a transparent filter or others. The color filter in white (W) may not be formed, or may be a white or transparent color filter. Alternatively, the shape of the light shielding film SF1 is not limited to the lattice form, and the light shielding film SF1 may be formed in a stripe form.

In the display region DPA, a plurality of opening portions are formed in the light shielding film SF1, and the color filter is embedded inside the plurality of opening portions.

The liquid crystal layer LCL forming a display image by applying a display voltage between the pixel electrode PE and the common electrode CE is provided between the substrate FS and the substrate BS. The liquid crystal layer LCL modulates light that passes therethrough depending on a state of an electric field applied thereto.

Noted that the thickness of the liquid crystal layer LCL is extremely smaller than the respective thicknesses of the substrate FS and the substrate BS. For example, the thickness of the liquid crystal layer LCL is about 0.1% to 10% of the respective thicknesses of the substrate FS and the substrate BS.

<Equivalent Circuit of Display Apparatus>

Next, an equivalent circuit of a display apparatus will be described with reference to FIG. 4. FIG. 4 is a diagram illustrating an equivalent circuit of the display apparatus according to the embodiment.

Figure 4:
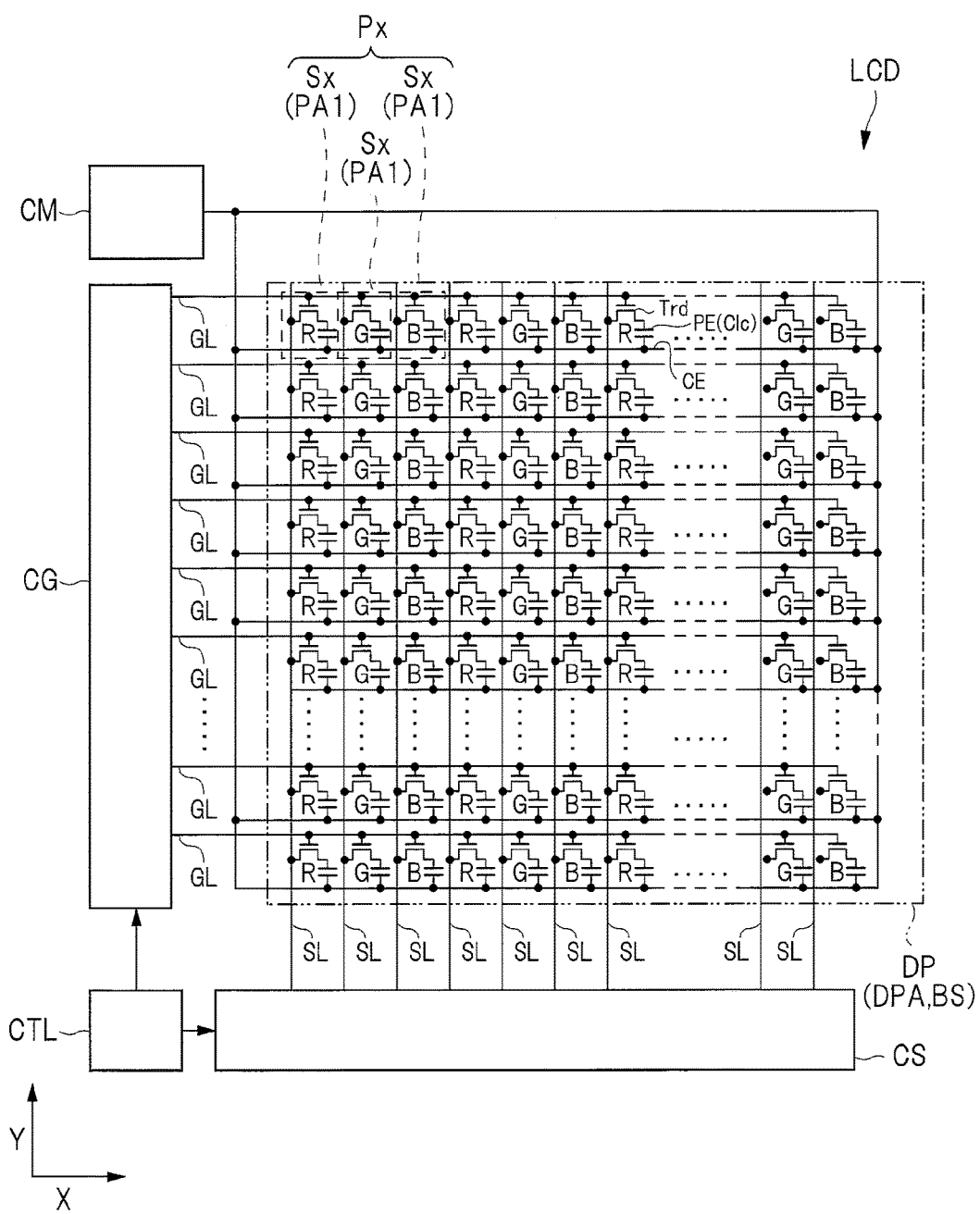
FIG. 4 is a diagram illustrating an equivalent circuit of the display apparatus according to the embodiment.

As illustrated in FIG. 4, the display section DP in the display apparatus LCD includes the plurality of pixels Px. The plurality of pixels Px are provided in the substrate BS inside the display region DPA in a plan view, and are arranged in a matrix form in the X-axis direction and the Y-axis direction.

The substrate BS of the display apparatus LCD includes the plurality of scanning lines GL and the plurality of signal lines (video lines) SL. The plurality of scanning lines GL are provided in the substrate BS in the display region DPA (see, for example, FIG. 2), extend in the X-axis direction, and are arranged in the Y-axis direction. The plurality of signal lines SL are provided in the substrate BS in the display region DPA, extend in the Y-axis direction, and are arranged in the X-axis direction. The plurality of signal lines SL and the plurality of scanning lines GL intersect each other.

Each of the plurality of pixels Px includes sub-pixels Sx respectively representing the colors R (red), G (green), and B (blue). While each of the sub-pixels Sx is provided in a region surrounded by the two scanning lines GL adjacent to each other and the two signal lines SL adjacent to each other, it may have other configurations.

Each of the sub-pixels Sx includes a transistor Trd of a thin film transistor, the pixel electrode PE connected to a drain electrode in the transistor Trd, and the common electrode CE opposing the pixel electrode PE with a liquid crystal layer sandwiched therebetween. In FIG. 4, a liquid crystal capacitance equivalently representing a liquid crystal layer and a retaining capacitance formed between the common electrode CE and the pixel electrode PE are indicated as a capacitance Clc. Note that a drain electrode and a source electrode of a thin film transistor are appropriately switched to each other by the polarity of the potential.

When a region where the sub-pixel Sx is formed is a pixel region PA1, the display region DPA includes a plurality of pixel regions PA1. The pixel region PA1 is a pixel region serving as a first pixel region. The pixel regions PA1 are formed by the plurality of scanning lines GL and the plurality of signal lines SL intersecting each other.

The circuit section CC (see FIG. 1) in the display apparatus LCD includes the signal line driving circuit CS, the scanning line driving circuit CG, a control circuit CTL, and a common electrode driving circuit CM.

The source electrode in each of the transistors Trd in the plurality of sub-pixels Sx arranged in the Y-axis direction is connected to the signal line SL. Each of the plurality of signal lines SL is connected to the signal line driving circuit CS.

A gate electrode in each of the transistors Trd in the plurality of sub-pixels Sx arranged in the X-axis direction is connected to the scanning line GL. Each of the scanning lines GL is connected to the scanning line driving circuit CG.

The control circuit CTL controls the signal line driving circuit CS, the scanning line driving circuit CG, and the common electrode driving circuit CM based on display data, a clock signal, and a display control signal such as a display timing signal that are transmitted from outside of the display apparatus LCD.

The control circuit CTL appropriately converts and outputs the display data and the display control signal fed from outside to the signal line driving circuit CS, the scanning line driving circuit CG, and the common electrode driving circuit CM depending on the arrangement of the sub-pixels in the display apparatus, a display method, the presence or absence of the RGB switch (illustration is omitted), or the presence or absence of a touch panel.

<Configuration of Frame Region and Vicinity of Frame Region>

Figure 5:
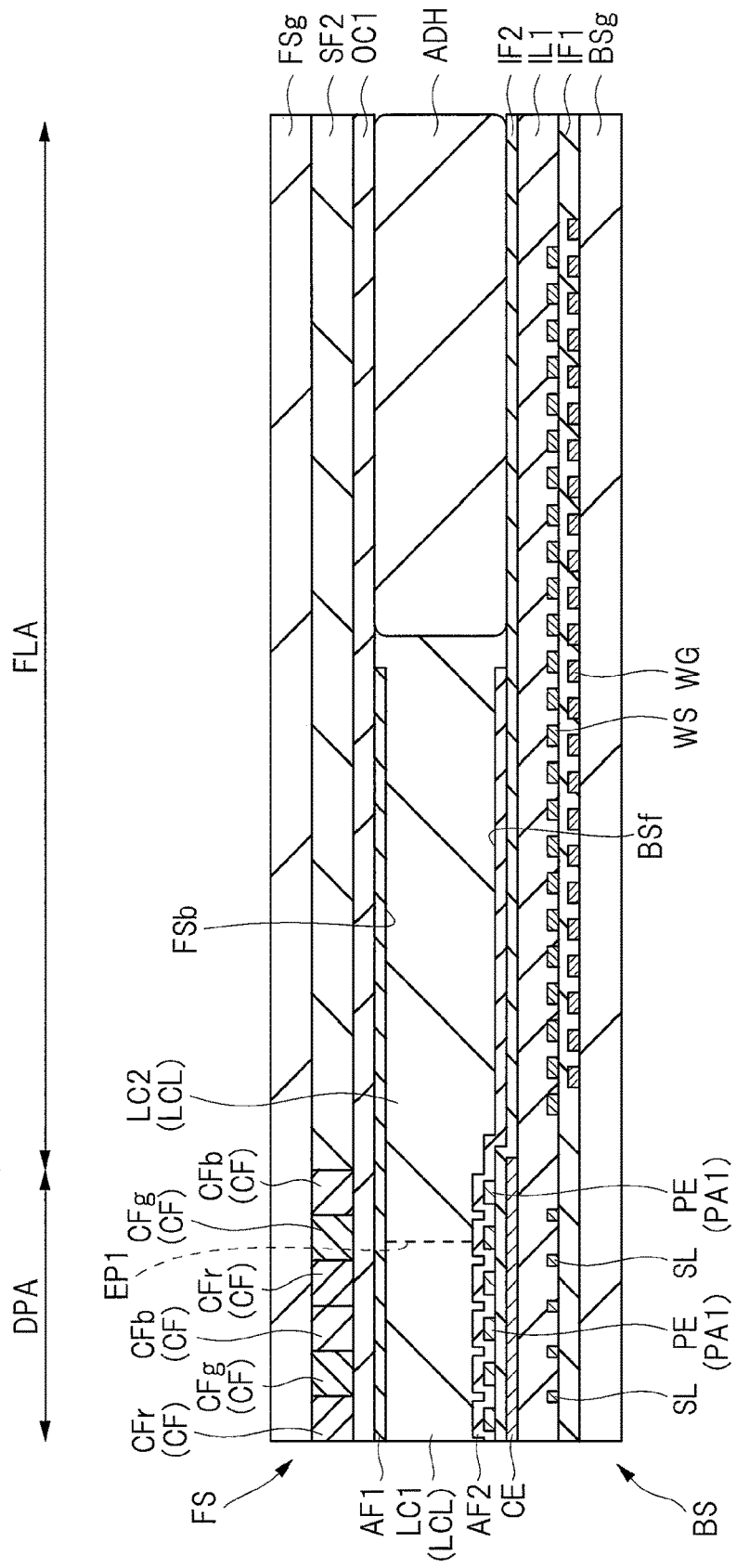
FIG. 5 is a cross-sectional view of a frame region and the vicinity of the frame region in a display apparatus in a comparative example.
Figure 6:
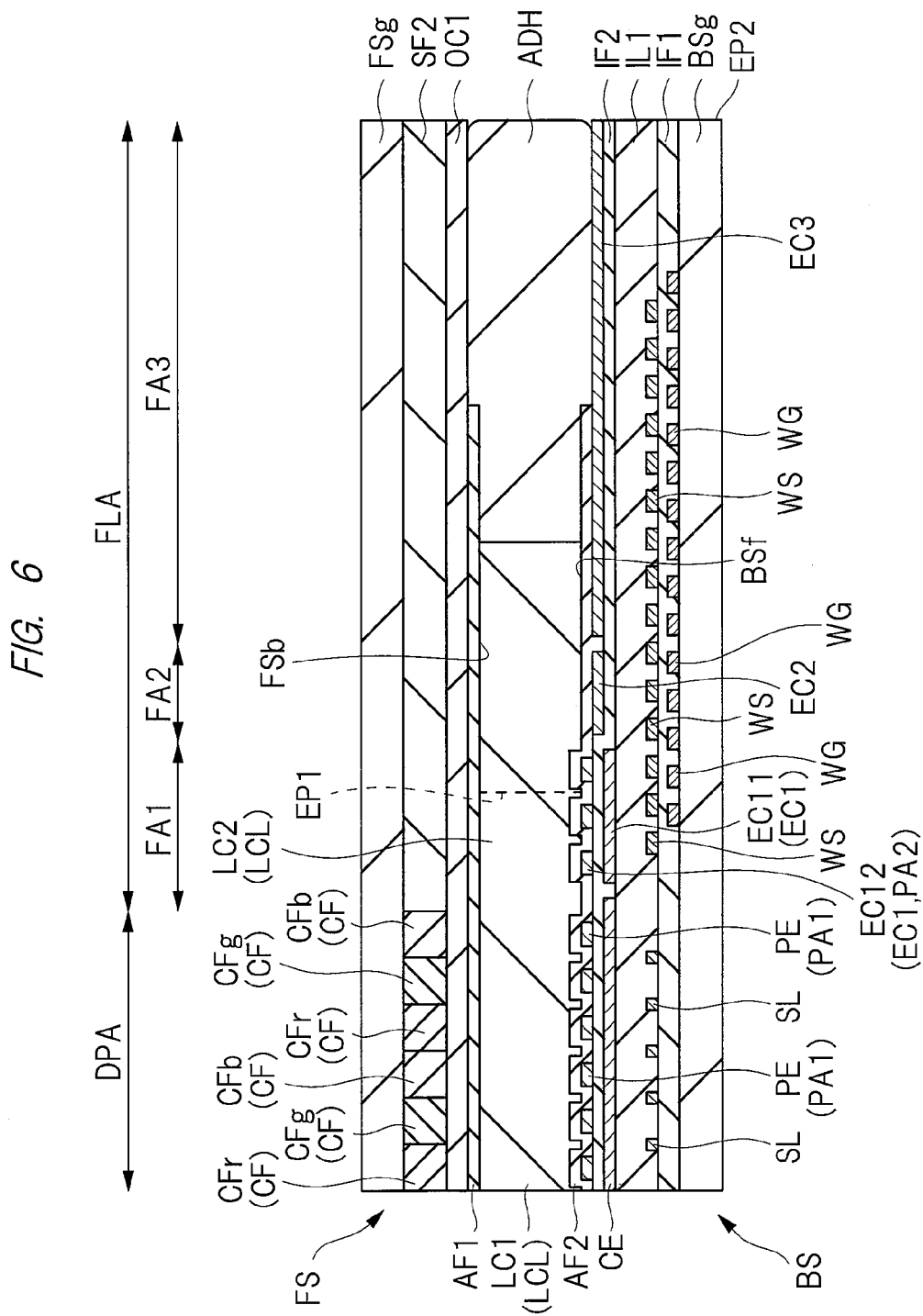
FIG. 6 is a cross-sectional view of a frame region and the vicinity of the frame region in an example of the display apparatus according to the embodiment.
Figure 7:
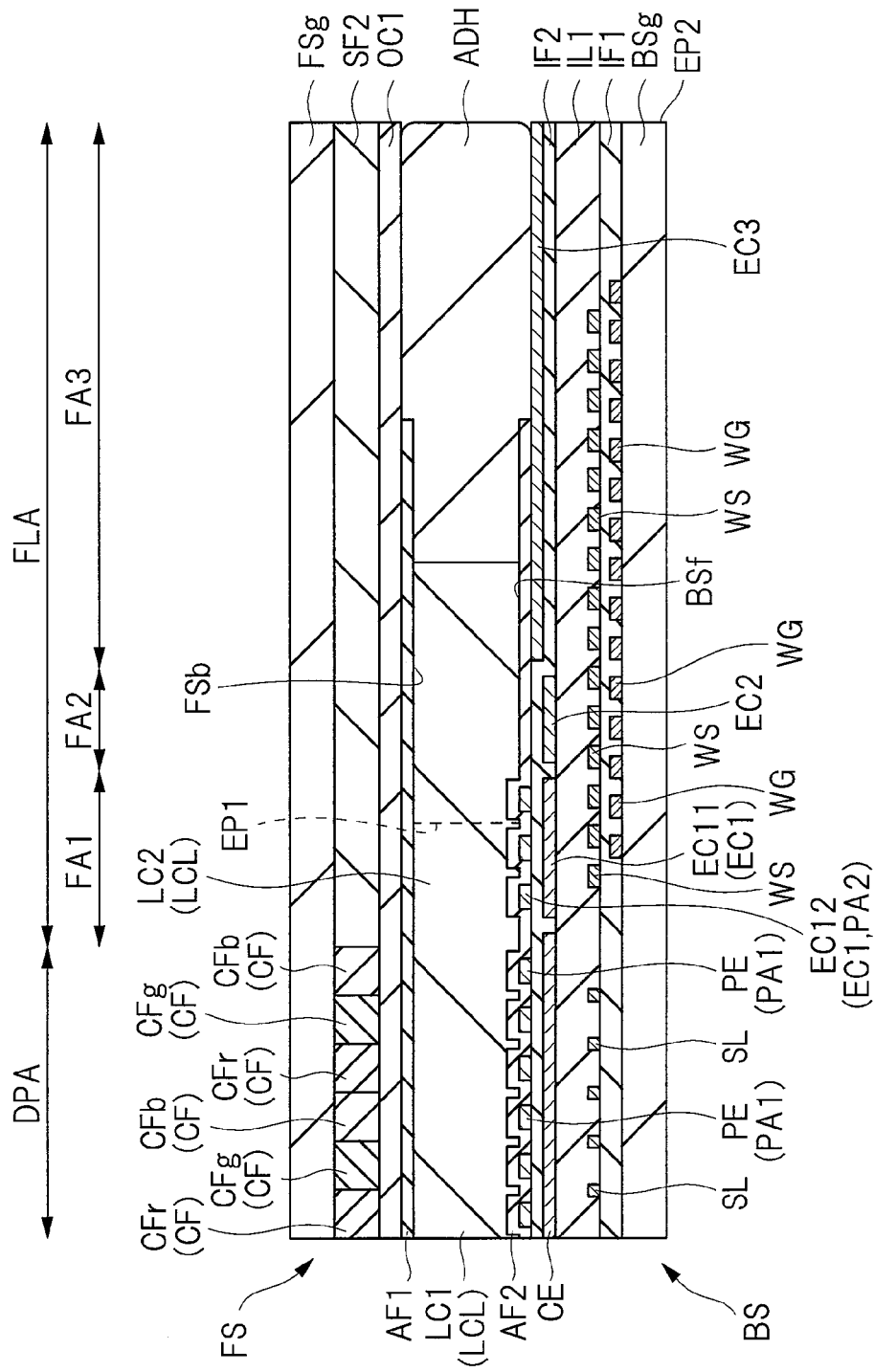
FIG. 7 is a cross-sectional view of a frame region and the vicinity of the frame region in another example of the display apparatus according to the embodiment.

Next, a configuration of a frame region and vicinity of the frame region will be described while comparing the embodiment and a comparative example. FIG. 5 is a cross-sectional view of a frame region and the vicinity of the frame region in a display apparatus in the comparative example. FIG. 6 is a cross-sectional view of a frame region and the vicinity of the frame region in an example of the display apparatus according to the embodiment. FIG. 7 is a cross-sectional view of a frame region and the vicinity of the frame region in another example of the display apparatus according to the embodiment.

First, similar sections in the display apparatus in the comparative example to those in the display apparatus according to the embodiment will be described. In other words, similar sections in the display apparatus according to the embodiment to those in the display apparatus in the comparative example will be described.

As illustrated in FIGS. 5 and 6, in both the comparative example and the embodiment, a wiring WG, an insulating film IF1, a wiring WS, an interlayer resin film IL1, an insulating film IF2, and an orientation film AF2 are provided on a front surface BSf of a substrate BS in a frame region FLA. As illustrated in FIGS. 5 and 6, in both the comparative example and the embodiment, the insulating film IF1, a signal line SL, the interlayer resin film IL1, a common electrode CE, the insulating film IF2, a pixel electrode PE, and the orientation film AF2 are provided on the front surface BSf of the substrate BS in a display region DPA.

In the frame region FLA, the wiring WG is formed on a base material BSg. The wiring WG is formed in the same layer as, for example, the scanning line GL (see FIG. 4), and is made of a metal such as chromium (Cr) or molybdenum (Mo) or an alloy of the metals. That is, preferably, the wiring WG is made of a conductive film having a light shielding property, such as a metal film or an alloy film.

In the frame region FLA, the insulating film IF1 is formed on the base material BSg so as to cover the wiring WG. The insulating film IF1 is a transparent insulating film made of, for example, silicon nitride, silicon oxide, or others. Note that the insulating film IF1 is formed on the base material BSg in the display region DPA.

In the frame region FLA, the wiring WS is formed on the insulating film IF1. The wiring WS is formed in the same layer as, for example, the signal line SL, and is made of a metal film having a multilayer structure in which, for example, aluminum (Al) is sandwiched by molybdenum (Mo) or others. That is, preferably, the wiring WG is composed of a conductive film having a light shielding property, such as a metal film. Note that the signal line SL is formed on the insulating film IF1 in the display region DPA.

In the frame region FLA, the interlayer resin film IL1 serving as a protective film or a smoothing film is formed on the insulating film IF1 so as to cover the wiring WG. The interlayer resin film IL1 is made of, for example, acrylic photosensitive resin. In the display region DPA, note that the interlayer insulating film IL1 is formed on the insulating film IF1 so as to cover the signal line SL.

In the frame region FLA, the insulating film IF2 is formed on the interlayer resin film IL1. The insulating film IF2 is a transparent insulating film made of, for example, silicon nitride or silicon oxide.

In the display region DPA, the common electrode CE is formed on the interlayer resin film IL1. The common electrode CE is made of a transparent conductive material such as ITO (Indium Tin Oxide) or IZO (Indium Zinc Oxide). In the display region DPA, the insulating film IF2 is formed on the interlayer resin film IL1 so as to cover the common electrode CE.

In the frame region FLA, the orientation film AF2 is formed on the insulating film IF2. The orientation film AF2 orients a liquid crystal layer LCL. The orientation film AF2 is made of, for example, polyimide resin.

Note that the pixel electrode PE is formed on the insulating film IF2 in the display region DPA. The pixel electrode PE is made of a transparent conductive material such as ITO or IZO. As illustrated in FIG. 4, the pixel electrode PE is formed inside each of a plurality of pixel regions PA1. In the display region DPA, the orientation film AF2 is formed on the insulating film IF2 so as to cover the pixel electrode PE.

As illustrated in FIGS. 5 and 6, in both the comparative example and the embodiment, a light shielding film SF2, a resin layer OC1, and an orientation film AF1 are provided on a back surface FSb of a substrate FS in the frame region FLA.

In the frame region FLA, the light shielding film SF2 is formed on the back surface FSb of the substrate FS. That is, the frame region FLA is covered with the light shielding film SF2. The light shielding film SF2 is formed outside the display region DPA in a plan view, and each pixel region in the display region DPA is not superimposed on the light shielding film SF2 in a plan view. The light shielding film SF2 is made of, for example, a black resin or a low-reflective metal as similar to the light shielding films SF1 (see FIG. 3). As described above, the light shielding film SF2 is formed over the entire surface of the frame region FLA in a plan view as different from the light shielding film SF1 formed in a lattice shape in a plan view.

Note that a color filter CF is formed in the display region DPA on the back surface FSb of the substrate FS. As the color filter CF, for example, a color filter pixel CFr in red (R), a color filter pixel CFg in green (G), and a color filter pixel CFb in blue (B) are formed.

In the frame region FLA, the resin layer OC1 is formed so as to cover the light shielding film SF2. The resin layer OC1 contains thermosetting resin or a photo-curable resin. Note that the resin layer OC1 is formed in the display region DPA so as to cover the color filter CF.

Note that the color filter CF may be formed between the light shielding films SF1 (see FIG. 3) and the substrate FS. And, a spacer may be formed between the resin layer OC1 and the substrate BS.

In the frame region FLA, the orientation film AF1 is formed between the resin layer OC1 and the substrate BS so as to cover the resin layer OC1. The orientation film AF1 orients the liquid crystal layer LCL. The orientation film AF1 is made of, for example, polyimide resin.

As illustrated in FIGS. 5 and 6, in both the comparative example and the embodiment, in the frame region FLA, a seal material ADH is provided between the insulating film IF2 and the resin layer OC1 on the outer periphery side of the substrate BS, i.e., on the outer periphery side of the substrate FS. That is, the seal material ADH is a bonding section which is provided between the substrate BS and the substrate FS so as to bond the substrate BS and the substrate FS, and is a sealing section which seals the liquid crystal layer LCL.

Next, sections in the display apparatus in the comparative example which are different from those in the display apparatus according to the embodiment, and a problem in the display apparatus in the comparative example will be described.

As illustrated in FIG. 5, in the comparative example, the insulating film IF2 is provided on the entire surface of the interlayer resin film IL1 in the frame region FLA. In the frame region FLA, the orientation film AF2 is not superimposed on the seal material ADH in a plan view.

In the display apparatus in the comparative example, when moisture enters the frame region FLA beyond the seal material ADH from outside of the display apparatus, impurity ions are generated from the entering moisture. Alternatively, when impurities are contained in the liquid crystal layer LCL, the orientation film AF1 or AF2, the seal material ADH, the substrate BS or FS, or others, impurity ions are generated from the impurities. The generation of the impurity ions has a risk of dropping of a voltage applied to the liquid crystal layer LCL or occurrence of spots in an image displayed by each of the pixels.

The generated impurity ions are drawn and are gradually gathered by an electric field formed by the scanning lines GL (see FIG. 4) and the signal lines SL in the display region DPA and an electric field formed by the wirings WG and WS included in a peripheral circuit in the frame region FLA. Therefore, if the amount of the generated impurity ions is large or if the width of the frame region FLA is narrow, the generated impurity ions do not stay in the frame region FLA, and also extend and move into the display region DPA, and therefore, there is a risk of occurrence of a failure in an image displayed in the display region DPA.

FIG. 5 illustrates a state in which an end EP1 of the portion LC2 on the display region DPA side is arranged inside the display region DPA, obtained when a portion where there are few impurity ions is a portion LC1 and a portion where there are many impurity ions is a portion LC2 in the liquid crystal layer LCL.

Meanwhile, as illustrated in FIG. 5, when the interlayer resin film IL1 composed of an organic insulating film, which covers the wirings WG and WS, is further covered with the insulating film IF2 composed of an inorganic insulating film, the entering of the moisture from the outside of the display apparatus is prevented or suppressed so that the wirings WG and WS can be protected not to corrode due to the entering moisture.

However, if the seal material ADH contacts the insulating film IF2, the seal material ADH easily peels off from the substrate BS since an adhesive force between the insulating film IF2 composed of an inorganic insulating film and the seal material ADH is small. This is considered to be because the adhesive force of the seal material ADH is weakened since fluorine remains on a surface of the insulating film IF2 when, for example, the insulating film IF2 is patterned by dry etching using gas containing fluorine.

When the orientation film AF2 is interposed between the insulating film IF2 and the seal material ADH, the adhesive force between the insulating film IF2 and the seal material ADH is further weakened. Therefore, the seal material ADH more easily peels off from the substrate BS. This is considered to be because the surface roughness of the seal material ADH and the surface roughness of the orientation film AF2 differ from each other, because chemical coupling between functional groups or a force between molecules of the insulating film IF2 or the orientation film AF2 are weak, or because of others.

In order to prevent such peeling off of the seal material ADH, it is required to increase the width of the seal material ADH, or it is required not to superimpose the seal material ADH with the orientation film AF2 in a plan view in the display apparatus in the comparative example. Therefore, the width of the frame region FLA cannot be easily narrowed.

The formation of a conductive film in the same layer as the pixel electrode PE, on the insulating film IF2 in the frame region FLA is also considered in order to prevent the impurity ions from being gathered by shielding the electric field formed by the wirings WG and WS included in the peripheral circuit or in order to improve an adhesive force between the insulating film IF2 or the orientation film AF2 and the seal material ADH. Such a conductive film is used as an electric field shield which shields the wirings WG and WS included in the peripheral circuit in the frame region FLA.

However, since the conductive film is used as the electric field shield when the width of the frame region FLA is further narrowed while the conductive film in the same layer as the pixel electrode PE is formed on the insulating film IF2 in the frame region FLA, a region where a pixel electrode serving as a dummy pixel electrode is formed cannot be ensured. If high definition of an image displayed by the display apparatus is attempted in a state the dummy pixel electrode is not formed, there is a risk of decrease in the uniformity in the dimensional accuracy of the line width of the pixel electrode PE or others particularly in the vicinity of a boundary between the frame region FLA and the display region DPA since the display region DPA and the frame region FLA are different from each other in the area ratio of a pattern used when the conductive film is patterned to form the pixel electrodes PE.

A technical idea in the display apparatus according to the present embodiment is for solving such a problem of the display apparatus in the comparative example, and is for preventing or suppressing the extension and movement of the impurity ions into the display region DPA and the peeling off of the seal material ADH even if the width of the frame region FLA is narrowed. Next, a configuration of the frame region and the vicinity of the frame region in the display apparatus according to the present embodiment will be described. Similar sections in the display apparatus according to the embodiment to those in the display apparatus in the comparative example have already been described, and therefore, the following is the explanation about different sections in the display apparatus according to the embodiment from those in the display apparatus in the comparative example.

As illustrated in FIG. 6, in the display apparatus according to the present embodiment, the substrate BS includes the frame region FLA as similar to the display apparatus in the comparative example. However, as different from the display apparatus in the comparative example, the frame region FLA includes a frame region FA1 serving as a first peripheral region, a frame region FA2 serving as a second peripheral region, and a frame region FA3 serving as a third peripheral region. The frame region FA1 is superimposed on the light shielding film SF2 in a plan view, and is positioned outside the display region DPA in a plan view. The frame region FA2 is positioned closer to the outer periphery of the substrate BS or FS than the frame region FA1 in a plan view. The frame region FA3 is positioned closer to the outer periphery of the substrate BS or FS than the frame region FA2 in a plan view.

In the display apparatus according to the present embodiment, the substrate BS includes an electrode EC1 serving as a first electrode, an electrode EC2 serving as a second electrode, and an electrode EC3 serving as a third electrode. The electrode EC1 is formed in the frame region FA1, the electrode EC2 is formed in the frame region FA2, and the electrode EC3 is formed in the frame region FA3.

In the frame region FA1, the wiring WG is formed on the base material BSg. In the frame region FA1, the insulating film IF1 is formed on the base material BSg so as to cover the wiring WG, and the wiring WS is formed on the insulating film IF1. In the frame region FA1, the interlayer resin film IL1 is formed on the insulating film IF1 so as to cover the wiring WS.

In the frame region FA1, an electrode EC11 serving as a part of the electrode EC1 is formed on the interlayer resin film IL1. The electrode EC11 is formed in the same layer as the common electrode CE, and is made of the same material as that of the common electrode CE, i.e., a transparent conductive material such as ITO or IZO. Therefore, in the frame region FA1, the insulating film IF2 is formed on the interlayer resin film IL1 so as to cover the electrode EC11.

In the frame region FA1, a plurality of electrodes EC12 each serving as the other part of the electrode EC1 are formed on the interlayer resin film IL1. The electrode EC12 is formed in the same layer as the pixel electrode PE, and is made of the same material as that of the pixel electrode PE. In the frame region FA1, note that the orientation film AF2 is formed on the insulating film IF2 so as to cover the electrode EC12.

The electrode EC11 is used as an electric field shield which shields an electric field formed by the wirings WG and WS. On the other hand, the electrode EC12 is used as a dummy pixel electrode because of being formed in the same layer as the pixel electrode PE but being arranged outside the display region DPA so as not to contribute to the display of the image displayed in the display region DPA. That is, by the formation of the electrode EC12 in the frame region FA1, the dummy pixel electrode can be arranged in a portion of the frame region FLA, the portion being in the vicinity of the display region DPA. The electrode EC12 serving as the dummy pixel electrode is formed inside each of the plurality of pixel regions PA2 included in the frame region FA1. The pixel region PA2 is a dummy pixel region serving as a second pixel region.

When a conductive film is patterned to form the pixel electrode PE if the electrode EC12 serving as the dummy pixel electrode is formed in the same layer as the pixel electrode PE, the respective area ratios of patterns in the display region DPA and the frame region FLA can be nearly equal to each other. Therefore, the uniformity in the dimensional accuracy of the line width of the pixel electrode PE can be improved.

A potential (first potential) is applied to the electrode EC12 serving as the dummy pixel electrode included in the electrode EC1. The potentials respectively applied to the plurality of pixel electrodes PE are sequentially driven in a certain direction, i.e., are driven while being scanned in the display region DPA, so that the impurity ions generated in the display region DPA tend to move to one end of the display region DPA. In the present embodiment, the potentials respectively applied to, for example, the plurality of pixel electrodes PE and the plurality of electrodes EC12 are driven while being scanned, so that the impurity ions, which have moved to the one end of the display region DPA, can be further moved to the outside of the display region DPA. That is, the potential applied to the electrode EC12 serving as the dummy pixel electrode is driven while being scanned as similar to the potential applied to the pixel electrodes PE, so that the impurity ions can be moved to the outside of the display region DPA and be integrated outside the display region DPA. Therefore, the impurity ions can be prevented or suppressed from remaining in the display region DPA.

On the other hand, the potential applied to the electrode EC11 included in the electrode EC1 can be made equal to an average potential of the pixel electrodes in the display region DPA, and can be made equal to, for example, a potential applied to the common electrode CE. Alternatively, since it is not required to display an image in the pixel region PA2, a potential applied to the electrode EC11 may be made equal to a potential (first potential) applied to the electrode EC12 serving as the dummy pixel electrode.

Alternatively, the electrode EC12 serving as the dummy pixel electrode may not be provided. In such a case, only the electrode EC11 is included in the electrode EC1. However, the potential (first potential) is applied to the electrode EC11 so that the electrode EC11 can also be used as a trap electrode. Even if the electrode EC12 is provided, a potential may not be applied to the electrode EC12 but may be applied to the electrode EC11. That is, the electrode EC1 may be the electrode EC11.

In the frame region FA2, the wiring WG is formed on the base material BSg. In the frame region FA2, the insulating film IF1 is formed on the base material BSg so as to cover the wiring WG, and the wiring WS is formed on the insulating film IF1. In the frame region FA2, the interlayer resin film IL1 is formed on the insulating film IF1 so as to cover the wiring WS.

In the frame region FA2, the insulating film IF2 is formed on the interlayer resin film IL1. In the frame region FA2, the electrode EC2 is formed on the insulating film IF2. The electrode EC2 is formed in the same layer as the pixel electrode PE, and is made of the same material as that of the pixel electrode PE, that is Y, a transparent conductive material such as ITO or IZO. In the frame region FA2, note that the orientation film AF2 is formed on the insulating film IF2 so as to cover the electrode EC2.

A potential (second potential) with a positive or negative polarity is applied to the electrode EC2. If the potential with a positive polarity is applied to the electrode EC2, impurity ions with a negative polarity can be trapped, integrated, and retained. On the other hand, if the potential with a negative polarity is applied to the electrode EC2, impurity ions with a positive polarity can be trapped, integrated, and retained.

Preferably, the potential (second potential) applied to the electrode EC2 is larger in an absolute value than the potential (first potential) applied to the electrode EC1. Thus, impurity ions in the liquid crystal layer LCL are more drawn to the electrode EC2 than the electrode EC1.

Alternatively, in the present embodiment, the electrode EC2 is not formed at the bottom of a trench section formed in the interlayer resin film IL1 as different from a modification to the embodiment described later. Therefore, the wiring WS is formed below the electrode EC2. In such a case, the potential (second potential) applied to the electrode EC2 is preferably made equal to a potential applied to the wiring WS below the electrode EC2. Thus, a function of the electrode EC2 as a trap electrode which traps the impurity ions can be improved.

In the frame region FA3, the wiring WG is formed on the base material BSg. In the frame region FA3, the insulating film IF1 is formed on the base material BSg so as to cover the wiring WG, and the wiring WS is formed on the insulating film IF1. In the frame region FA3, the interlayer resin film IL1 is formed on the insulating film IF1 so as to cover the wiring WS.

In the frame region FA3, the insulating film IF2 is formed on the interlayer resin film IL1. In the frame region FA3, the electrode EC3 is formed on the insulating film IF2. The electrode EC3 is formed in the same layer as the pixel electrode PE, and is made of the same material as that of the pixel electrode PE, that is, a transparent conductive material such as ITO or IZO. In the frame region FA3, note that the orientation film AF2 is formed on a portion of the insulating film IF2 so as to cover the electrode EC3, the portion being on the frame region FA2 side. In the frame region FA3, the seal material ADH is superimposed on the orientation film AF2 and contacts the orientation film AF2 in a plan view.

In the frame region FA3, the electrode EC3 is formed between the seal material ADH and the insulating film IF2. Thus, an adhesive force between the seal material ADH and the insulating film IF2 can be improved. Therefore, it is not required to increase the width of the seal material ADH, so that the width of the frame region FLA can be easily narrowed. In the frame region FA3, even if a part of the seal material ADH is superimposed on the orientation film AF2 in a plan view, the other part of the seal material ADH contacts the electrode EC3, and therefore, the adhesive force between the seal material ADH and the insulating film IF2 can be improved.

The electrode EC2 is not superimposed on the seal material ADH in a plan view, and the electrode EC3 is superimposed on the seal material ADH in a plan view. An end of the seal material ADH, the end being on the display region DPA side, is arranged closer to the opposite side of the display region DPA side than an end of the electrode EC2, the end being on the opposite side of the display region DPA side. In such a case, the seal material ADH is formed in the frame region FA3 but is not formed in the frame region FA2. The width of the seal material ADH can be narrowed.

If the electrode EC3 is formed on the insulating film IF2, an insulating property between the electrode EC3 and the wirings WG and WS can be more improved than that obtained when the electrode EC3 is formed in the same layer as that of the common electrode CE between the insulating film IF2 and the interlayer resin film IL1. Each parasitic capacitance between the electrode EC3 and the wiring WG and between the electrode EC3 and the wiring WS can be reduced, and a load applied to a circuit of the display apparatus can be reduced.

A potential is applied to the electrode EC3, the potential being equal to the potential (first potential) applied to the electrode EC1 or having an opposite polarity to that of the potential (second potential) applied to the electrode EC2. Thus, impurity ions with a polarity different from that of impurity ions trapped by the electrode EC2 can be trapped, integrated, and retained.

For example, if negative ions are generated as the impurity ions from the seal material ADH and positive ions are generated as impurity ions from the liquid crystal layer LCL, a potential (third potential) applied to the electrode EC3 has a positive polarity, and the potential (second potential) applied to the electrode EC2 has a negative polarity. Thus, the negative ions from the seal material ADH can be trapped by the electrode EC3, and the positive ions from the liquid crystal layer LCL can be trapped by the electrode EC2.

Note that a potential (third potential) different from the potential (second potential) applied to the electrode EC2 may be simply applied to the electrode EC3. However, impurity ions with a polarity different from that of the impurity ions trapped by the electrode EC2 can be more trapped when a potential with an opposite polarity to that of the potential (second potential) applied to the electrode EC2 is applied to the electrode EC3. Therefore, a function of the electrode EC3 as a trap electrode which traps the impurity ions can be enhanced.

Thus, in the display apparatus according to the present embodiment, by the electrodes EC2 and EC3, the impurity ions having opposite polarities to each other can be trapped, and occurrence of a failure in an image displayed in the display region DPA can be prevented or suppressed.

That is, in the display apparatus according to the present embodiment, the potential (second potential) having a larger absolute value than that of the potential (first potential) applied to the electrode EC1 is applied to the electrode EC2, and the potential (third potential) different from the potential (second potential) applied to the electrode EC2 is applied to the electrode EC3. Thus, even if the width of the frame region FLA is narrowed, the expansion and movement of the impurity ions into the display region DPA and the peeling off of the seal material ADH can be prevented or suppressed.

FIG. 6 illustrates a state in which an end EP1 of a portion LC2, the end being on the display region DPA side, is arranged outside the display region DPA when a portion LC1 is a portion having few impurity ions in the liquid crystal layer LCL and the portion LC2 is a portion having many impurity ions.

Preferably, the potential (third potential) applied to the electrode EC3 is larger in an absolute value than the potential (second potential) applied to the electrode EC2. Thus, the respective absolute values of the electrode EC1, EC2, and EC3 are increased in this order, and the impurity ions can be reliably trapped by the electrode EC3 on the outermost periphery side of the substrate BS among the electrodes EC1, EC2, and EC3.

Alternatively, for example, if negative ions are generated as impurity ions from the seal material ADH and positive ions are generated as impurity ions from the liquid crystal layer LCL, both the potential (second potential) applied to the electrode EC2 and the potential (third potential) applied to the electrode EC3 are preferably negative potentials. Thus, the negative ions generated as the impurity ions from the seal material ADH are blocked by the electrode EC3 and cannot move toward the liquid crystal layer LCL, and the positive ions generated as the impurity ions from the liquid crystal layer LCL are drawn toward the electrode EC3, are trapped, and are moved toward the seal material ADH side.

Alternatively, as illustrated as another example of the present embodiment in FIG. 7, in a frame region FA2, an electrode EC2 may be formed on an interlayer resin film IL1, and an insulating film IF2 may be formed on the electrode EC2. At this time, the electrode EC2 is formed in the same layer as a common electrode CE, and is made of the same material as that of the common electrode CE such as a transparent conductive material such as ITO or IZO.

However, when the electrode EC2 is formed on the insulating film IF2 as illustrated in FIG. 6, an insulating property between the electrode EC2 and the wirings WG and WS can be more improved than that obtained when the electrode EC2 is formed in the same layer as the common electrode CE between the insulating film IF2 and the interlayer resin film IL1 as illustrated in FIG. 7. Each parasitic capacitance between the electrode EC2 and the wiring WG and between the electrode EC2 and the wiring WS can be reduced, and a load applied to a circuit of the display apparatus can be reduced.

In the present embodiment, note that the explanation has been made about an example in which the display apparatus according to the present embodiment is applied to an FFS-mode display apparatus as a display apparatus in a horizontal electric field mode. However, the display apparatus according to the present embodiment is applicable to a display apparatus in a vertical electric field mode such as a VA mode instead of the display apparatus in the horizontal electric field mode. In such a case, the common electrode CE and the electrode EC11 can be provided on the back surface FSb of the substrate FS serving as an opposite substrate.

<Modification of Display Apparatus According to Embodiment>

Figure 8:
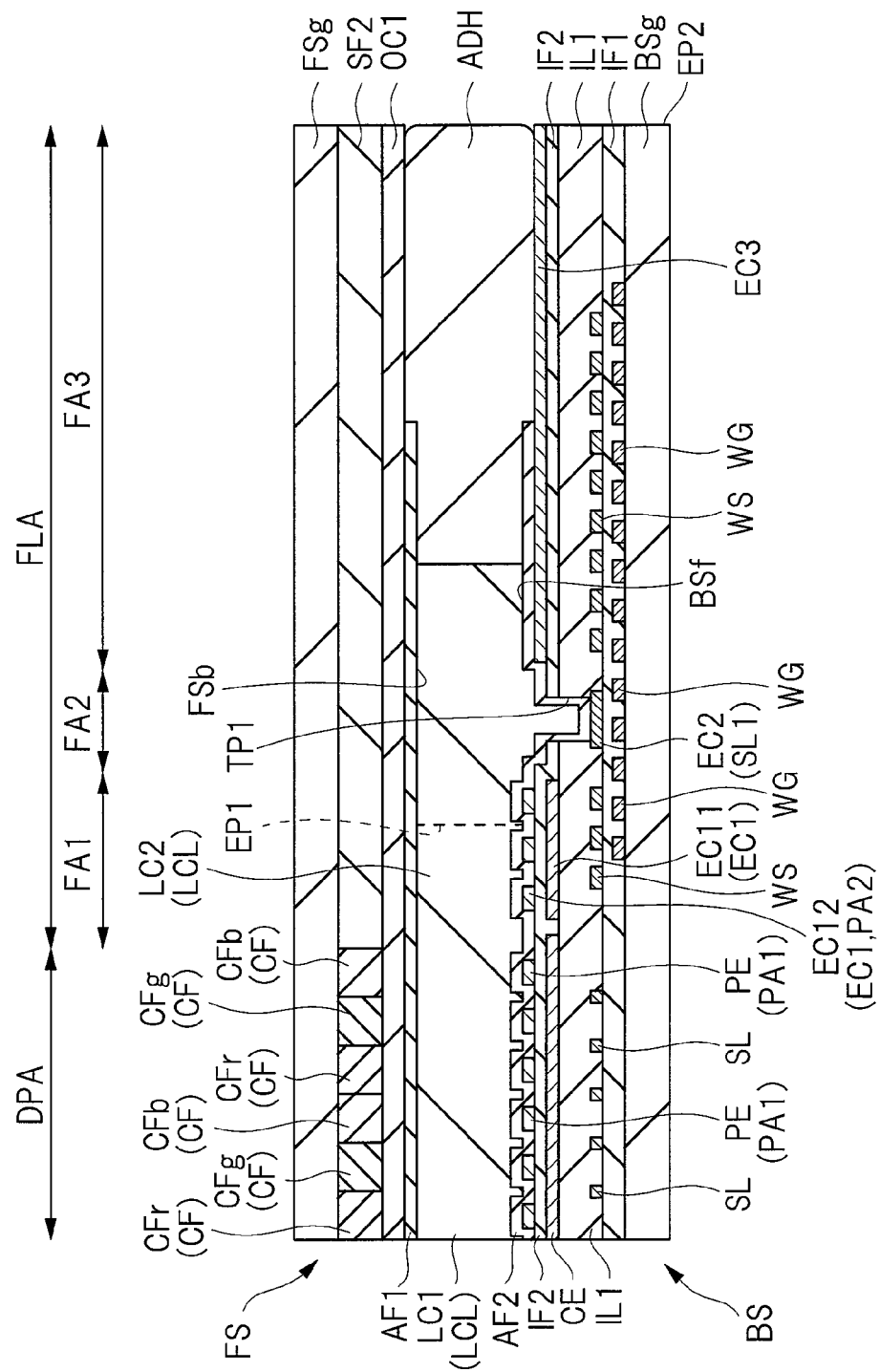
FIG. 8 is a cross-sectional view of a frame region and the vicinity of the frame region in an example of a modification example of the display apparatus according to the embodiment.
Figure 9:
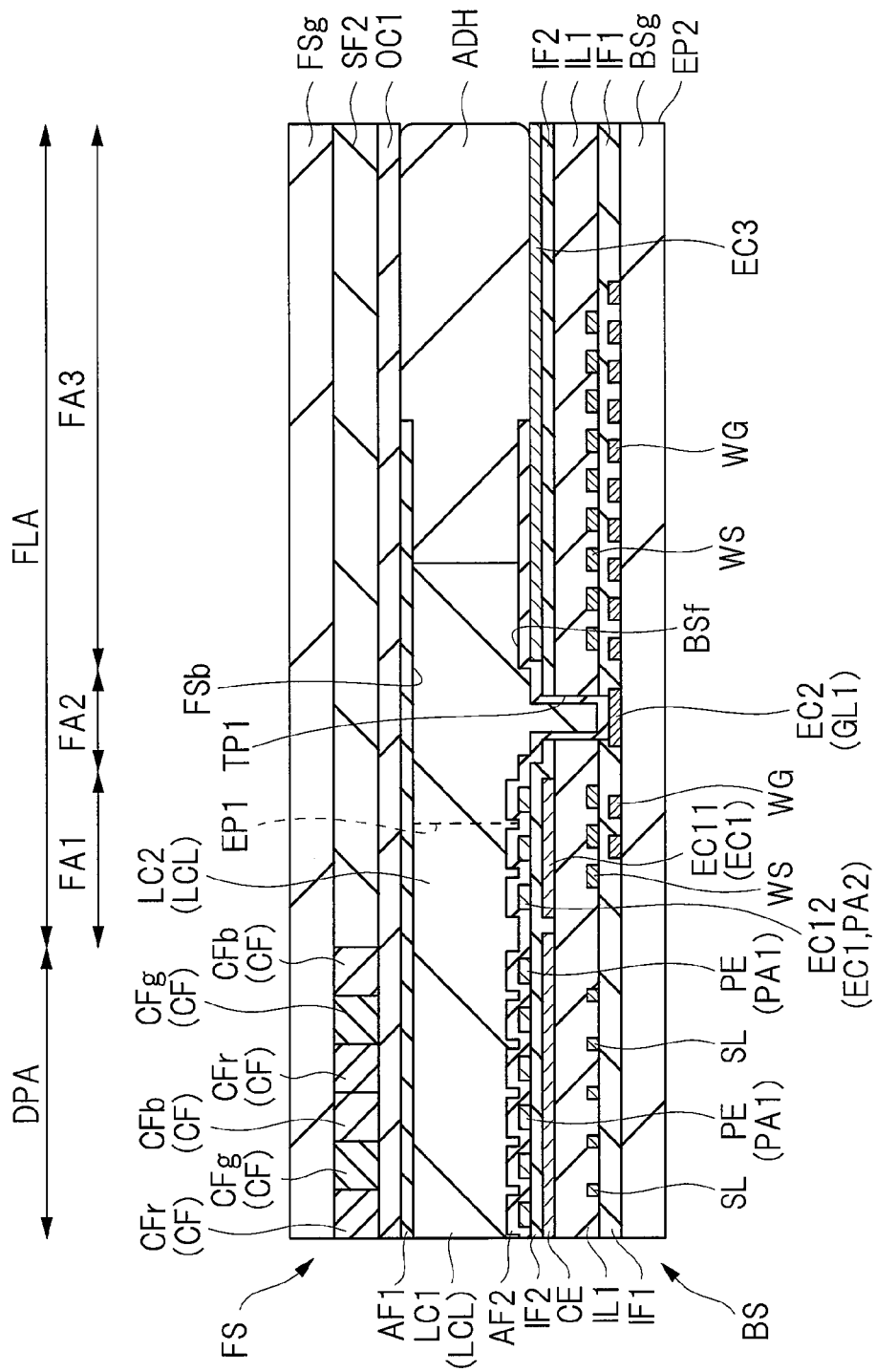
FIG. 9 is a cross-sectional view of a frame region and the vicinity of the frame region in another example of the modification example of the display apparatus according to the embodiment.

Next, a modification of the present embodiment will be described. FIG. 8 is a cross-sectional view of a frame region and the vicinity of the frame region in an example of the modification of the display apparatus according to the embodiment. FIG. 9 is a cross-sectional view of a frame region and the vicinity of the frame region in another example of the modification to the display apparatus according to the embodiment. FIG. 10 is a plan view of a frame region and the vicinity of the frame region in another example of the modification of the display apparatus according to the embodiment. Note that FIG. 9 is a cross-sectional view taken along a line C-C illustrated in FIG. 10. FIG. 10 illustrates a transparent state with the removal of a portion higher than an insulating film IF2 (closer to the substrate FS side), the portion being higher than the pixel electrode PE, an electrode EC12, and an electrode EC3 (closer to the substrate FS side).

In the present modification, in a frame region FA2, an electrode EC2 is formed at the bottom of a trench section TP1 formed in an insulating film IF2 and an interlayer resin film IL1.

As illustrated in FIG. 8, also in the display apparatus in the present modification, a frame region FLA includes a frame region FA1 serving as a first peripheral region, the frame region FA2 serving as a second peripheral region, and a frame region FA3 serving as a third peripheral region as similar to the display apparatus according to the embodiment. Each section formed in the frame regions FA1 and FA3 in the display apparatus in the present modification is similar to each section formed in the frame regions FA1 and FA3 in the display apparatus according to the embodiment, and therefore, description for this section is omitted.

In the present modification, as similar to the embodiment, in the frame region FA2, a wiring WG is formed on a base material BSg. In the frame region FA2, an insulating film IF1 is formed to cover the wiring WG on the base material BSg.

On the other hand, in the present modification, as different from the embodiment, in the frame region FA2, the electrode EC2 is formed on the insulating film IF1. The electrode EC2 is formed in the same layer as those of the wiring WS and the signal line SL, and is made of the same material as those of the wiring WS and the signal line SL, such as a metal film having a multilayer structure in which aluminum (AL) is sandwiched by molybdenum (Mo) or others. In the frame region FA2, the interlayer resin film IL1 is formed on the insulating film IF1 so as to cover the electrode EC2, and an insulating film IF2 is formed on the interlayer resin film IL1.

In the present modification, as different from the embodiment, in the frame region FA2, the trench section TP1, which penetrates the insulating film IF2 and the interlayer resin film IL1 to reach the electrode EC2, is formed, and the electrode EC2 is exposed to the bottom of the trench section TP1. That is, the insulating film IF2 and the interlayer resin film IL1 have the trench section TP1 in the frame region FA2, and the electrode EC2 is formed at the bottom of the trench section TP1. An orientation film AF2 is formed on the electrode EC2 exposed to the bottom of the trench section TP1, on a side surface of the trench section TP1, and on the insulating film IF2 outside the trench section TP1.

Also in the present modification, as similar to the present embodiment, a potential (second potential) with a positive or negative polarity is applied to the electrode EC2. If the potential with a positive polarity is applied to the electrode EC2, impurity ions having a negative polarity can be trapped, accumulated, and retained. On the other hand, if the potential with a negative polarity is applied to the electrode EC2, impurity ions having a positive polarity can be trapped, accumulated, and retained. Therefore, preferably, the potential (second potential) applied to the electrode EC2 is larger in absolute value than a potential (first potential) applied to an electrode EC1.

In the present modification, as different from the present embodiment, the trench section TP1 is formed in the insulating film IF2 and the interlayer resin film IL1 in the frame region FA2 between the frame region FA1 and the frame region FA3. Therefore, when impurity ions generated in the frame region FA3 are trapped once by the electrode EC2 formed at the bottom of the trench section TP1, the impurity ions are difficult to move to the frame region FA1 and a display region DPA beyond the trench section TP1, and therefore, are more efficiently trapped. When impurity ions generated in the frame region FA1 are trapped once by the electrode EC2 formed at the bottom of the trench section TP1, the impurity ions are difficult to move to the outside of the trench section TP1, and therefore, are more efficiently trapped. That is, a function of the electrode EC2 as a trap electrode is enhanced.

The moisture which has entered a seal material ADH from outside and has moved from the frame region FA3 toward the frame region FA1 is difficult to move to the frame region FA1 and the display region DPA beyond the trench section TP1. That is, the entering of the moisture to the display region DPA can be more reliably prevented or suppressed.

In the present modification, the electrode EC2 is formed of, for example, a metal film having a multilayer structure in which aluminum is sandwiched by molybdenum or others. Therefore, the resistance of the electrode EC2 can be made lower than that in the embodiment in which the electrode EC2 is made of a transparent conductive material, and therefore, uniformity of a potential in the electrode EC2 caused when the potential is applied to the electrode EC2 can be improved, and power consumption of a circuit which applies the potential to the electrode EC2 can be reduced.

The electrode EC2 may be a signal lead line (video lead line) SL1 connected to the signal lines SL. Such a case does not require to newly provide the circuit which applies the potential to the electrode EC2, and therefore, the potential can be applied to the electrode EC2 by the signal line driving circuit CS (see FIG. 4) which inputs a signal to the signal lines SL.

Alternatively, as illustrated in FIG. 9 as the other example of the present modification, an electrode EC2 may be formed on a base material BSg in a frame region FA2. On the base material BSg in the frame region FA2, an insulating film IF1, an interlayer resin film IL1, and an insulating film IF2 may be sequentially formed so as to cover the electrode EC2, and a trench section TP1 which penetrates the insulating film IF2, the interlayer resin film IL1 and the insulating film IF1 to reach the electrode EC2 may be formed. At this time, the electrode EC2 is formed in the same layer as that of the wiring WG, and is made of the same material as that of the wiring WG, i.e., a metal such as chromium (Cr) or molybdenum (Mo) or an alloy of the metals.

As illustrated in FIG. 10, in a planar arrangement in the example illustrated in FIG. 9, the trench section TP1 preferably extends in a direction intersecting an arrangement direction of the electrode EC1, the electrode EC2, and electrode EC3. Thus, the entering of the moisture from the electrode EC3 side into the electrode EC2 side through the interlayer resin film IL1 can be prevented or suppressed.

More preferably, the trench TP1 extends in an extending direction of an end EP2 of a substrate BS. Thus, the entering of the moisture from the outside of the display apparatus through the interlayer resin film IL1 can be prevented or suppressed.

As illustrated in FIG. 10, a pixel electrode PE extends in a direction intersecting the arrangement direction of the electrode EC1, the electrode EC2, and the electrode EC3. As illustrated in FIG. 10 so as to be enlarged, the pixel electrode PE has a plurality of slits SLT each of which extends in the extending direction of the pixel electrode PE and each of which is arranged in the arrangement direction of the electrode EC1, the electrode EC2, and the electrode EC3. As illustrated in FIG. 10, the electrode EC12 extends in a direction intersecting the arrangement direction of the electrode EC1, the electrode EC2, and the electrode EC3. As illustrated in FIG. 10 so as to be enlarged, the electrode EC12 has a plurality of slits each of which extends in the extending direction of the electrode EC12 and each of which is arranged in the arrangement direction of the electrode EC1, the electrode EC2, and the electrode EC3.

As illustrated in FIG. 10, in a plan view, the pixel electrode PE inclined in a clockwise direction from the extending direction of the trench section TP1 or the extending direction of the end EP2 of the substrate BS and the pixel electrode PE inclined in a counterclockwise direction the extending direction of the trench section TP1 or the extending direction of the end EP2 of the substrate BS may be alternately arranged in the extending direction of the trench section TP1 or the extending direction of the end EP2 of the substrate BS. Thus, the hue difference (retardation) caused depending on a direction of view to liquid crystal molecules can be reduced. Alternatively, in a plan view, the electrode EC12 inclined in a clockwise direction from the extending direction of the trench section TP1 or the extending direction of the end EP2 of the substrate BS and the electrode EC12 inclined in a counterclockwise direction the extending direction of the trench section TP1 or the extending direction of the end EP2 of the substrate BS may be alternately arranged in the extending direction of the trench section TP1 or the extending direction of the end EP2 of the substrate BS.

Note that a planar arrangement in the example illustrated in FIG. 8 can be also similar to that in the plan view of FIG. 10 except that the electrode EC2 is not formed in the same layer as that of the wiring WG but in the same layer as that of the wiring WS and the signal line SL. Therefore, even in the example illustrated in FIG. 8, the trench section TP1 preferably extends in a direction intersecting the arrangement direction of the electrode EC1, the electrode EC2, and an electrode EC3, and more preferably extends in the extending direction of the end EP2 of the substrate BS.

The electrode EC2 may be a scanning lead line GL1 connected to the scanning line GL (see FIG. 4). Such a case does not require ton newly provide a circuit which applies a potential to the electrode EC2, and therefore, the potential can be applied to the electrode EC2 by the scanning line driving circuit CG (see FIG. 4) which inputs a signal to the scanning line GL.

However, the resistance of the electrode EC2 can be made lower in the formation of the electrode EC2 on the insulating film IF1 in the same layer as that of the wiring WS and the signal line SL as illustrated in FIG. 8 than the formation of the electrode EC2 between the insulating film IF1 and the base material BSg in the same layer as that of the wiring WG as illustrated in FIG. 9. Therefore, the uniformity of the potential in the electrode EC2 caused when the potential is applied to the electrode EC2 can be more improved, and the power consumption of the circuit which applies the potential to the electrode EC2 can be more reduced.

Also when the electrode EC2 is formed above the interlayer resin film IL1, i.e., also in the present embodiment, note that the electrode EC2 can be used as a signal lead line or a scanning lead line.

In the foregoing, the invention made by the present inventor has been concretely described based on the embodiments. However, it is needless to say that the present invention is not limited to the foregoing embodiments and various modifications and alterations can be made within the scope of the present invention.

In the above-described embodiments, the case of the liquid crystal display apparatus has been exemplified as the disclosure example. However, as another application example, various types of flat-panel display apparatuses such as an organic EL display apparatus, other self-luminous type display apparatus, and an electronic-paper type display apparatus having an electrophoretic element can be exemplified. And, it is needless to say that the present invention is applicable to display apparatuses ranging from small- or middle-sized one to large one without any particular limitation.

In the scope of the idea of the present invention, various modified examples and alteration examples could have been easily thought up by those who skilled in the art, and it would be understood that these various modified examples and alteration examples belong to the scope of the present invention.

For example, the ones obtained by appropriate addition, removal, or design-change of the components to/from/into each of the above-described embodiments by those who skilled in the art or obtained by addition, omitting, or condition-change of the step to/from/into each of the above-described embodiments are also within the scope of the present invention as long as they include the concept of the present invention.

The present invention is effectively applied to a display apparatus.

What is claimed is:

1. A display apparatus comprising:
   a substrate including a display region including a plurality of first pixel regions;
   a light shielding film formed outside the display region in a plan view; and
   a liquid crystal layer opposing the display region,
   wherein the substrate includes:
   a first peripheral region which is superimposed on the light shielding film in a plan view and is positioned outside the display region in a plan view;
   a second peripheral region which is positioned outside the first peripheral region in a plan view;
   a third peripheral region which is positioned outside the second peripheral region in a plan view;
   a first electrode formed in the first peripheral region;
   a second electrode formed in the second peripheral region; and
   a third electrode formed in the third peripheral region,
   a first potential is applied to the first electrode,
   a second potential, which is larger in an absolute value than the first potential, is applied to the second electrode, and
   a third potential, which is different from the second potential, is applied to the third electrode.

2. The display apparatus according to claim 1,
   wherein the first peripheral region includes a plurality of second pixel regions, and the first electrode is formed in the second pixel region.

3. The display apparatus according to claim 2,
wherein the substrate includes:
an insulating base material;
an insulating film formed on the insulating base material; and
a pixel electrode formed in the first pixel region, and
the third electrode and the pixel electrode are formed in the same layer as each other.

4. The display apparatus according to claim 2,
wherein the substrate includes:
an insulating base material; and
an insulating film formed on the insulating base material,
the third electrode is formed on the insulating film,
the insulating film has a trench section in the second peripheral region, and
the second electrode is formed at a bottom of the trench section.

5. The display apparatus according to claim 2,
wherein the substrate includes:
a plurality of scanning lines; and
a plurality of video lines intersecting the plurality of scanning lines,
the plurality of first pixel regions are formed by intersection between the plurality of scanning lines and the plurality of video lines, and
the second electrode is a scanning lead line connected to the scanning line or a video lead line connected to the video line.

6. The display apparatus according to claim 2,
wherein the third potential with a reverse polarity to a polarity of the second potential is applied to the third electrode.

7. The display apparatus according to claim 1,
wherein the substrate includes:
an insulating base material;
an insulating film formed on the insulating base material; and
a pixel electrode formed in the first pixel region, and
the third electrode and the pixel electrode are formed in the same layer as each other.

8. The display apparatus according to claim 7,
wherein the substrate includes:
a plurality of scanning lines; and
a plurality of video lines intersecting the plurality of scanning lines,
the plurality of first pixel regions are formed by intersection between the plurality of scanning lines and the plurality of video lines, and
the second electrode is a scanning lead line connected to the scanning line or a video lead line connected to the video line.

9. The display apparatus according to claim 7,
wherein the third potential with a reverse polarity to a polarity of the second potential is applied to the third electrode.

10. The display apparatus according to claim 1,
wherein the substrate includes:
an insulating base material; and
an insulating film formed on the insulating base material,
the third electrode is formed on the insulating film,
the insulating film has a trench section in the second peripheral region, and
the second electrode is formed at a bottom of the trench section.

11. The display apparatus according to claim 10,
wherein the trench section extends in a direction intersecting an arrangement direction of the first electrode, the second electrode, and the third electrode.

12. The display apparatus according to claim 10,
wherein the substrate includes:
a plurality of scanning lines; and
a plurality of video lines intersecting the plurality of scanning lines,
the plurality of first pixel regions are formed by intersection between the plurality of scanning lines and the plurality of video lines, and
the second electrode is a scanning lead line connected to the scanning line or a video lead line connected to the video line.

13. The display apparatus according to claim 10,
wherein the third potential with a reverse polarity to a polarity of the second potential is applied to the third electrode.

14. The display apparatus according to claim 1,
wherein the substrate includes:
a plurality of scanning lines; and
a plurality of video lines intersecting the plurality of scanning lines,
the plurality of first pixel regions are formed by intersection between the plurality of scanning lines and the plurality of video lines, and
the second electrode is a scanning lead line connected to the scanning line or a video lead line connected to the video line.

15. The display apparatus according to claim 14,
wherein the third potential with a reverse polarity to a polarity of the second potential is applied to the third electrode.

16. The display apparatus according to claim 1,
wherein the third potential with a reverse polarity to a polarity of the second potential is applied to the third electrode.

17. The display apparatus according to claim 1 comprising
a seal material which seals the liquid crystal layer,
wherein the second electrode is not superimposed on the seal material in a plan view, and
the third electrode is superimposed on the seal material in a plan view.

18. The display apparatus according to claim 1,
wherein the third potential, which is larger in an absolute value than the second potential, is applied to the third electrode.

19. The display apparatus according to claim 1,
wherein the substrate includes:
an insulating base material;
an insulating film formed on the insulating base material;
an orientation film which orients the liquid crystal layer; and
a seal material which is formed in the third peripheral region and seals the liquid crystal layer,
the seal material and the orientation film contact each other in the third peripheral region, and
the third electrode is formed between the insulating film and the orientation film in the third peripheral region.

20. The display apparatus according to claim 1,
wherein the substrate includes:
a plurality of scanning lines; and
a plurality of video lines intersecting the plurality of scanning lines, the plurality of first pixel regions are formed by intersection between the plurality of scanning lines and the plurality of video lines, and the second electrode is made of the same material as a material for the video lines.

* * * * *